Aug. 11, 1931.   R. LAPSLEY   1,818,262
FOUR-SPEED TRANSMISSION
Filed Aug. 13, 1928   2 Sheets-Sheet 1
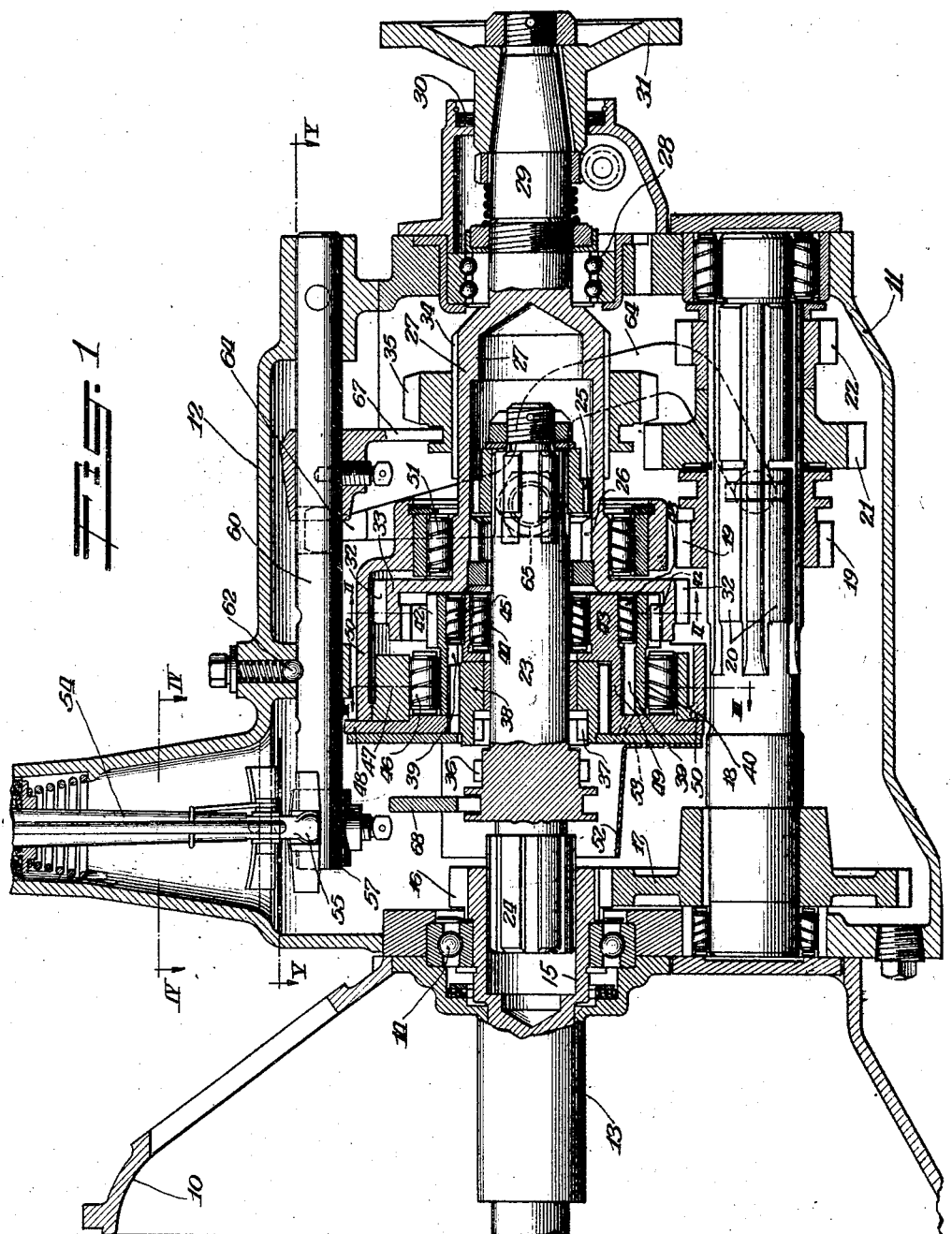
Inventor:
Robert Lapsley,
by: Charles H. Hills
Attys.

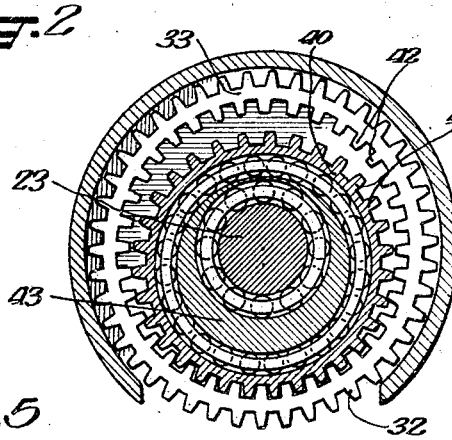
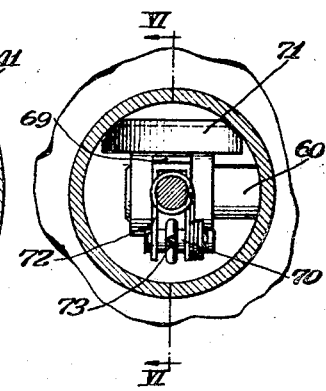
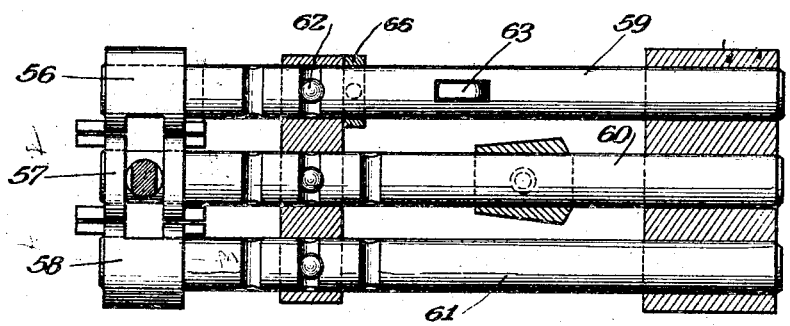
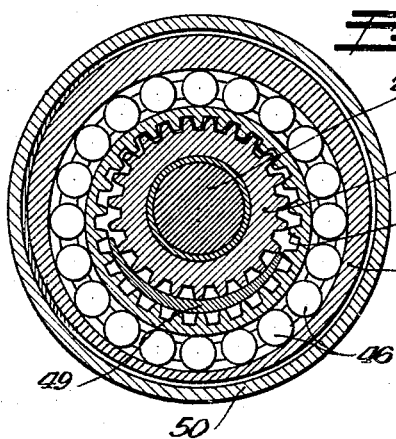
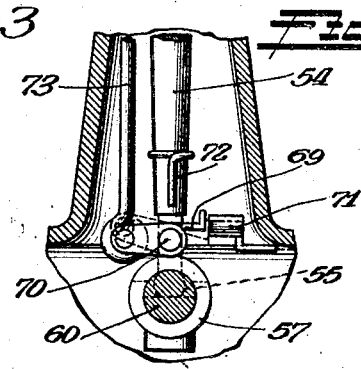

Patented Aug. 11, 1931

1,818,262

UNITED STATES PATENT OFFICE

ROBERT LAPSLEY, OF DETROIT, MICHIGAN, ASSIGNOR TO NORGE CORPORATION, OF DETROIT, MICHIGAN, A CORPORATION OF MICHIGAN

FOUR SPEED TRANSMISSION

Application filed August 13, 1928. Serial No. 299,170.

This invention relates to four speed transmission for automotive vehicles.

It is one of the objects of this invention to provide an improved four speed transmission wherein the three highest speeds and reverse can normally be treated as a standard three speed transmission as regards the movements of the gear shift lever to obtain the various speeds. The lowermost forward speed is treated as an emergency low speed that is normally latched out of engagement so that the operator must release the latch before the shift lever can be moved to engage the emergency low speed.

It is another object of this invention to provide a four speed transmission of the type described wherein one of the two highest speeds is a direct drive while the other is through intermeshing internal and external gearing including an internal-external gear floating in bearings in alignment with the gear tooth loads to eliminate gear distortion due to overhanging gear teeth.

It is also an object of this invention to provide a transmission of the type described embodying a self lubricating internal gear train having means adapted to collect lubricant thrown up by the counter shaft gears and to feed the lubricant into the internal gear train allowing it to work through the gears and bearings.

Other and further important objects of this invention will be apparent from the disclosure in the specification and the appended claims.

This invention (in a preferred form) is illustrated in the drawings and hereinafter more fully described.

On the drawings:

Figure 1 is a longitudinal vertical section through a transmission embodying the features of this invention.

Figure 2 is a section through the internal gears on the line II—II of Figure 1.

Figure 3 is a section through the internal gears on the line III—III of Figure 1.

Figure 4 is a section through the shift lever boss on the line IV—IV of Fig. 1.

Figure 5 is a horizontal section through the top of the transmission case showing the shifting shafts on the line V—V of Fig. 1.

Figure 6 is a vertical section on the line VI—VI of Figure 4.

As shown in the drawings:

The transmission details shown in Figure 1 comprise a clutch housing 10 intended to bolt against the open end of the engine flywheel or bell housing. This clutch housing in turn supports a transmission case 11 having a cover 12 containing the gear shifting mechanism.

The engine drive is transmitted through a clutch (not shown) to a clutch shaft 13 the forward end of which has the usual pilot bearing in the engine flywheel. The rear end of the clutch shaft is journaled in a ball bearing 14 and is recessed at 15 with internal splines and has external gear teeth 16 for engagement with a gear 17 keyed to a countershaft 18 which carries an emergency low speed gear 19 slidable thereon in splines 20, a fixed second speed countershaft gear 21, and a fixed reverse speed countershaft gear 22; which latter engages a reverse idler pinion, not shown in the drawings. With this arrangement, whenever the clutch is engaged, the countershaft and the gears thereon rotate in fixed speed relationship to the engine.

A sliding primary shaft 23 is provided at its forward end with splines 24 to engage the clutch shaft splines 15, the rear end of this shaft carrying a gear-like male jaw clutch 25 which engages when the shaft 23 is shifted forward, with corresponding female jaw clutch teeth 26 formed inside a hollow driven shaft 27 which is journaled in a bearing 28 and has a projecting extension 29 through a stuffing box 30 on the rear of the transmission case. The driven shaft extension is provided with a coupling flange 31 for engagement with the propeller shaft leading to the rear axle system of a vehicle. With the jaw clutches 25 and 26 engaged, a straight through or direct drive is obtained commonly called the fourth speed.

When the emergency low speed countershaft gear 19 is shifted forward on the countershaft 18, it engages with an external gear 32 formed on a drum-like enlargement 33 of the forward end of the driven shaft 27. The driving train from the clutch shaft 13 comprises the gear 16 which drives the countershaft gear 17 and the low speed gear 19 on the countershaft drives the gear 32 on the driven shaft 27 forming a double reduction gear train. The tubular portion of the driven shaft 27 carries external splines 34 engaging a sliding gear 35 which provides the second speed and reverse. When this gear 35 is shifted forward it engages the second speed gear 21 on the countershaft and when shifted to the rear from the position shown, it is in alignment with the reverse gear 22 on the countershaft and engages the idler gear (not shown) which provides the desired reversal of direction in the train of gears.

Third speed is obtained through an internal gear reduction interposed between the primary shaft 23 and the driven shaft 27. As this drive is independent of the countershaft it is sometimes called a second high, and the drive can be shifted back and forth between the two highest speeds, and at car speeds much higher than would be possible where the driving countershaft to be included in the driving gear train for one speed.

The primary shaft 23 carries clutch teeth 36 engageable by a backward shift of the shaft with complementary teeth 37 formed in a pinion 38 journaled on the shaft 23, this pinion 38 engaging in an internal gear 39 formed within an eccentrically mounted sleeve 40 having external gear teeth 41 engaging internal gear teeth 42 formed in the drum-like enlargement 33 of the driven shaft 37. To assist in understanding Figure 1 it may be stated that the gear teeth 38 and 39 mesh only above the center line of the shaft 23 while the gear teeth 41 and 42 mesh below the center line of this shaft due to the eccentric mounting of the sleeve 40.

A stationary eccentric 43 is provided to maintain the sleeve 40 in position, roller bearings 44 inside the eccentric providing a journal for the shaft 23 while roller bearings 45 are provided between the eccentric and the sleeve 40 in alignment with the external gear teeth 41 thereon. A roller bearing 46 envelopes the sleeve 40 in alignment with the internal gear teeth 39 therein so that the sleeve 40 is supported in alignment with the gear loads imposed thereon, preventing a twisting or angular deflection of the sleeve. An enveloping eccentric outer race 47 is provided for the roller bearing 46 and this bearing race is secured in any suitable manner to a flange 48 which is connected to the eccentric 43 by an integral crescent-shaped segment 49 extending through the gap between the gear teeth 38 and 39 diametrically opposite to their engaged position. The flange 48 is secured to a stationary enveloping casing 50 which has a roller bearing 51 engaging the shaft 27, the casing being supported in the transmission case and cut away underneath the low speed gear 32 to permit engagement thereof by the countershaft gear 19. Lubrication of the external gearing is amply provided for in the usual manner, as all the countershaft gears dip in a bath of lubricant maintained in the transmission case. The largest or driven gear 17 on the countershaft carries lubricant up to the clutch shaft and also throws a quantity of lubricant into the upper part of the transmission case. In order to catch this lubricant as it drains back, a frusto-conical segmental shield 52 is attached to the flange 48 and an oil drain hole 53 is provided from the trap so formed leading to the interior of the internal gear assembly adjacent the eccentric gear teeth 39 which distributes the lubricant throughout the internal gear mechanism, the lubricant finally working out through the gap in the casing 50.

The gear shifting mechanism comprises a single shift lever 54 the lower end 55 of which is transversely movable in suitable gates 56, 57, and 58, mounted on shifting shafts 59, 60, and 61. The shifting shafts are provided with the usual ball detents 62. As shown in Figure 5, the uppermost shaft 59 is apertured to receive the end 63 of a gear shifting lever 64 pivoted at 65 as shown in dotted lines in Figure 1, this lever engaging the low speed countershaft gear 19. As the gear 19 has only one movement, a collar 66 may be provided on the shaft 59 to prevent a reverse movement thereof. The shifting lever 64 is pivoted in this case in order to cause the top of the operator's shift lever 54 to move forward to engage the emergency low speed gear.

The intermediate shifting shaft 60 is provided with a shifting fork 67 engaging the second speed and reverse gear (32) which is slidable on the driven shaft 27. The lower shifting shaft 61 is provided with a shifting fork 68 integral with its gate 58, which fork engages the primary shaft to provide direct drive and third speed through the internal gear reduction.

The two shafts 60 and 61 when considered alone form a standard three speed gear shift of the H type wherein a forward movement of the top of the shift lever 54 provides either third or reverse, and a backward movement thereof engages either direct or second speed according to the lateral shift of the lever; second speed being considered to be the normal low speed of a three speed transmission, while the internal gear third speed is considered the equivalent of the normal intermediate or second speed. What is herein referred to as an emergency low speed provided for pulling out of mud holes and the like, is normally latched out of engagement by the shift lever 54 by means of a latch 69 pivoted to the shift lever at 70 and normally held in a position to strike a quadrant 71 by means of a spring 72. The latch is tilted down out of the way when desired by means of a latch rod 73 extending upwardly alongside the shift lever 54. When it is desired to engage the emergency low speed gear the latch rod is pulled up in any suitable manner by the operator, thus depressing the latch out of engagement with its quadrant permitting the lower end of the shift lever to be moved upwardly into engagement with the upper-most gate as shown in Figure 5. A forward movement of the top of the shift lever then causes a rearward shift of the shaft 59 which acts through the pivoted lever 64 to shift the low speed gear 19 forward into engagement with the drum gear 32. It will thus be seen that I have invented an improved four speed transmission wherein the lowermost forward speed is latched out and intended for emergency purposes, the remaining three forward speeds and reverse having a standard type of H or three speed shift which is familiar to all drivers of gear shift cars. A further advantage of this arrangement, wherein the normal intermediate speed is obtained through internal gearing, lies in the ease of shifting between the intermediate and direct drive even at high speed, and the relatively silent operation of the internal gearing due to the substantial bearings supporting the internal-external gear.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. In a transmission, an operating lever, low speed gear means, intermediate speed gear means, a high speed connection, a reverse gear means, an emergency low speed gear means, and means associated with the operating lever for normally locking the same from operative engagement with the emergency low speed gear means.

2. In a transmission, an operating lever, low speed gear means, intermediate speed gear means including an internal gear, a high speed connection, a reverse gear means, an emergency low speed gear means, and means associated with the operating lever for normally locking the same from operative engagement with the emergency low speed gear means.

3. In a transmission means affording connections for high, intermediate, low, reverse, and emergency low speeds, a lever movable according to the standard H arrangement for operatively actuating the first four mentioned speed means and normally latched releasable means permitting actuation of the lever to operatively actuate the emergency low speed means.

4. In a four speed and reverse transmission mechanism, shifting mechanism for selectively engaging the highest three speeds and reverse including a shifting lever movable according to the standard H arrangement, and a latch associated with said lever adapted when released to permit engagement of said lever with shifting mechanism for the lowest speed.

5. In a four speed and reverse transmission mechanism, gear shifting mechanism for selectively engaging gears to produce the various speeds, a shifting lever movable according to the standard H system for controlling the gear shifting mechanism for three highest speeds and reverse, and a latch associated with said lever adapted, when released, to permit engagement of said lever with the gear shifting mechanism for the lowest speed.

6. In a four speed and reverse transmission wherein one of the two highest speeds is obtained through internal gearing and the two lowest speeds are obtained through spur gearing the lowermost speed being provided for emergency purposes, shifting mechanism for selectively engaging the three highest speeds and reverse including a shifting lever movable according to the standard H arrangement, and a latch associated with said lever adapted when released to permit engagement of said lever with shifting mechanism for the lowest speed.

7. In a four speed and reverse transmission wherein one of the two highest speeds is obtained through internal gearing and the two lowest speeds are obtained through spur gearing the lowermost speed being provided for emergency purposes, gear shifting mechanism for selectively engaging gears to produce the various speeds, a shifting lever movable according to the standard H system for controlling the gear shifting mechanism for three highest speeds and reverse, and a latch associated with said lever adapted, when released, to permit engagement of said lever with the gear shifting mechanism for the lowest speed.

8. In a four speed and reverse transmission wherein one of the two highest speeds is obtained through internal gearing and the two lowest speeds are obtained through spur gearing the lowermost speed being provided for emergency purposes, means for selecting the various speeds including a standard gear shift for the three higher speeds and reverse, and a latch for normally locking the selective means from engaging with the emergency slow speed.

9. In a four speed forward and reverse transmission, intermeshing internal and external gearing forming one of the two higher speeds, shiftable means for selectively engaging said gearing and for providing a direct drive, a counter shaft, gearing associated therewith adapted to selectively provide the two lowest forward speeds and the reverse, a single selective gear shifting means for all of the speeds, and means for normally latching out the lowermost speed whereby to provide a standard gear shift arrangement for the remaining speeds.

10. In a four speed forward and reverse transmission, intermeshing internal and external gearing forming one of the two higher speeds, shiftable means for selectively engaging said gearing and for providing a direct drive, a counter shaft, gearing associated therewith adapted to selectively provide the two lowest forward speeds and the reverse, a single selective gear shifting means for all of the speeds, said gear shifting means having a standard H type of shift for the three highest speeds and reverse.

11. The combination with a transmission mechanism comprising a reverse train and four differential forward trains including an emergency low and a normal starting low, of a control therefor comprising a rockable shifter lever and connections cooperating to establish second or starting low, reverse, third and fourth by movements of said lever, respectively left rear, left forward, right forward and right rear, corresponding to first, reverse, second and third of a three speed transmission with standard gear shift, and also establishing emergency low by an abnormal movement.

12. The combination with a transmission mechanism comprising a reverse train and four differential forward trains including an emergency low, a normal starting low and a super-high of a control therefor comprising a rockable shifter lever and connections cooperating to establish second or starting low, reverse, third and fourth or super-high by movements of said lever respectively, left rear, left forward, right forward and right rear corresponding to first, reverse, second and third of a three speed transmission with standard gear shift and also establishing emergency low by an abnormal movement.

13. The combination with a transmission mechanism comprising a reverse train and four differential forward trains including an emergency low, a normal starting low and a super-high of a control therefor comprising a rockable shifter lever and connections cooperating to establish second or starting low, reverse, third and fourth or super-high by free movements of said lever, respectively, left rear, left forward, right forward and right rear corresponding to first, reverse, second and third of a three speed transmission with standard gear shift and also establishing emergency low by an abnormal movement, and means for normally restraining said lever from said abnormal movement.

14. The combination with a transmission mechanism, comprising a reverse train and four differential forward trains including an emergency low, a normal starting low, and a super-high, of a control therefor comprising a rockable shifter lever and connections cooperating to establish second or starting low, reverse, third and fourth or super-high, by free movements of said lever respectively, left rear and left forward in one plane, right forward and right rear in a second plane, said movements corresponding to first, reverse, second and third of a three speed transmission with standard gear shift and also establishing emergency low by an abnormal movement in a third plane to the left of said first mentioned plane, and means for normally restraining said lever from movement into said third plane.

In testimony whereof I have hereunto subscribed my name at Detroit, Wayne County, Michigan.

ROBERT LAPSLEY.